Feb. 3, 1931.　　　J. W. WILLIAMS　　　1,791,018
TIRE INFLATION CONTROL VALVE
Filed June 26, 1929
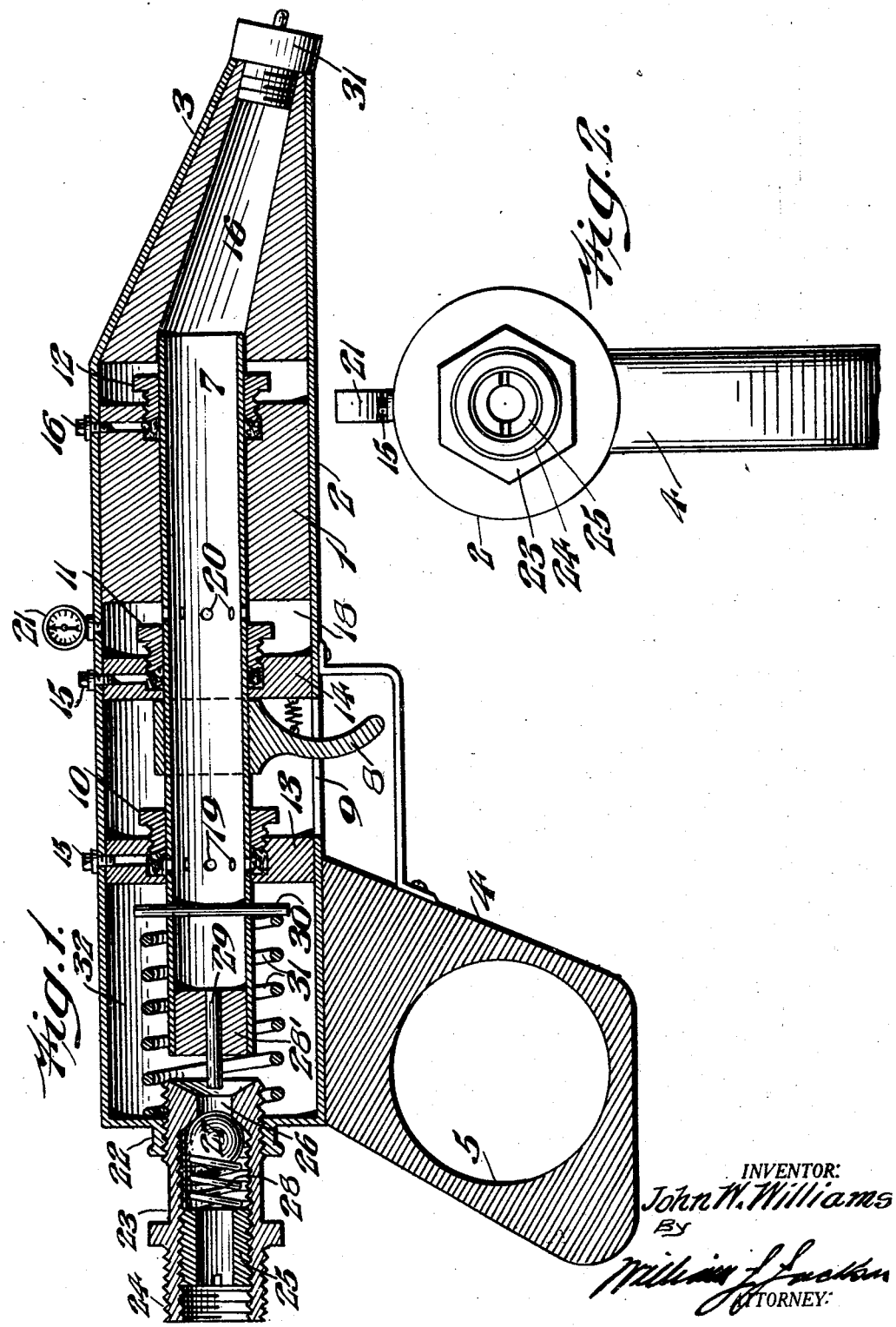
INVENTOR:
John W. Williams Patented Feb. 3, 1931

1,791,018

UNITED STATES PATENT OFFICE

JOHN W. WILLIAMS, OF PHILADELPHIA, PENNSYLVANIA

TIRE-INFLATION-CONTROL VALVE

Application filed June 26, 1929. Serial No. 373,766.

This invention relates to a controlling valve for air gages to be interposed between an air pressure tank and an air receiver, a mode of use more particularly contemplated being to include the controlling device in a piping between an air pressure tank and a valve on a pneumatic tire whereby the tire may be accurately inflated under immediate control of the operator.

The leading object of the present invention may be said to reside in the provision of a simple, efficient, and compact device constructed substantally in the form of a gun to be held in the hand of the operator so that the latter may easily and conveniently control the passage of air from an air pressure tank to a pneumatic tire and at all times be able to obtain an accurate indication upon the gage of the actual air pressure in the tire.

A further object of the present invention is to provide a device of the character above stated in which is provided a longitudinally shiftable trigger control cylinder for supplying air to a pneumatic tire in open position and in closed position cooperating with a gage to register pressure of tire inflation.

A further object of the present invention is to provide a device of the character stated which is portable in character and the handle of which is so constructed that the device may be conveniently suspended when not in use.

Other and further objects of the present invention reside in the provision of general details of construction and in the arrangement, combination, and connection of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1 is a view in longitudinal section of a controlling valve embodying the invention.

Fig. 2 is a view in end elevation of Fig. 1 as viewed from the left hand side of Fig. 1.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, reference numeral 1 designates the body portion of the device which in cross section is of solid, cylindrical form. Surrounding the body 1 is a casing 2 also of cylindrical form but of shell like or tubular structure. These parts constituting an elongated casing are generally tapered at their forward end as at 3 and the shell-like casing is provided at its rear end with a handle 4 apertured as at 5. The forward end of body 1 is centrally bored as at 6. This bore 6 is in communication with an endwise shiftable cylinder or barrel 7 operable by a trigger 8 which is fixed to said cylinder or barrel 7. The forward end of the barrel 7 engages with the interior wall of bore 6 in its forward movement, thereby providing means to limit the forward movement of barrel 7. The trigger 8 has endwise movement through a slot 9 in the outer casing 2 of the device. The cylinder or tube 7 is longitudinally movable through a series of packing rings designated 10, 11, and 12. The packing rings 10 and 11 are operatively fitted to disc-like members 13 and 14 fitted within the outer shell 2, which members 13 and 14 are secured in place as by means of screws or bolts 15. The packing ring 12 is operatively fitted with respect to body 1 and the outer casing 2 is secured with respect to body 1 by means of screw or bolt 16. Between the disk-like member 14 and the inner end of the body 1 is an annular space 18 in communication with an air gage 21. The longitudinally shiftable cylinder or barrel 7 is provided with an annular series of apertures 19 and 20, the function of which will presently appear, although at this time it may be stated that the apertures 19 and 20 in the shifting of the cylinder or barrel 7 coact with the annular recess of disk-like member 13 and annular space 18. The inner end of the outer shell 2 is provided with a screw threaded socket 22 to which it fitted a nipple 23 screw threaded at its outer end as at 24 internally screw threaded to receive a plug 25 and provided at its inner end with a valve seat 26. Fitted between the plug 25 and the valve seat 26 is a spherical ball 27 normally kept in contact with seat 26 by means of coiled spring 28. Fitted to the inner end of the cylinder or barrel 7 is a plug 28' carrying a fixed pin 29. This pin 29 in the movement of the cylinder or barrel 7 to the left in Fig. 1 dislodges valve 27 from its seat 26 to permit compressed air to pass to the interior of the outer casing 1. Fixed to the cylinder or barrel 7 is a pin 30, and arranged between this pin 30 and the inner wall of the left hand end of outer casing 2 is a coiled spring 31 which normally causes the cylinder or barrel 7 to assume the position shown in Fig. 1, in which position the apertures 19 of cylinder or barrel 7 are closed to the entrance of air from the chamber 32 to said cylinder or barrel 7 but the apertures 20 are in communication with the annular chamber 18 to permit the passage of such air pressure as is within cylinder or barrel 7 to pass to the gage 21. The outer end of the device is provided with a conventional connection 33 of such construction that when engaged with a tire valve said connection will serve to depress the stem of the tire valve for holding the latter open to permit a flow of air to pass to the tire, and also to permit a flow of air to pass from the tire to the gage 21, it being understood in this connection that the screw threaded end 24 of nipple 23 at this time is connected with a source of air pressure.

What I claim is:

1. A device of the character stated comprising an elongated casing having an interior chamber, said casing being provided at one end with a screw threaded socket and provided at its opposite end with a discharge port, a nipple having screw threaded relation with said socket and having an admission port and valve seat therein, said port being in communication with said chamber, an adjustable hollow plug arranged within said nipple, a spherical valve normally closing said port, a spring between said valve and plug, a longitudinally shiftable barrel arranged within said casing, the bore of which barrel is in communication with said chamber by means of ports when said valve is in open position, a pin secured to said barrel and penetrating the admission port of said nipple, and means including a finger piece carried by said barrel for shifting said barrel rearwardly to unseat said valve.

2. A device of the character stated comprising an elongated casing having on interior chamber, said casing being provided at one end with a screw threaded socket and provided at its opposite end with a discharge port, a nipple having screw threaded relation with said socket and having an admission port and valve seat therein, said port being in communication with said chamber, an adjustable hollow plug arranged within said nipple, a spherical valve normally closing said port, a spring between said valve and plug, a longitudinally shiftable barrel arranged within said casing, the bore of which barrel is in communication with said chamber by means of ports when said valve is in open position, a pin secured to said barrel and penetrating the admission port of said nipple, means including a finger piece carried by said barrel for shifting said barrel rearwardly to unseat said valve, and a spring for returning said barrel to normal position.

3. A device of the character stated comprising an elongated casing having an interior chamber, said casing being provided at one end with a screw threaded socket and provided at its opposite end with a discharge port, a nipple having screw threaded relation with said socket and having an admission port and valve seat therein, said port being in comunication with said chamber, an adjustable hollow plug arranged within said nipple, a spherical valve normally closing said port, a spring between said valve and plug, a longitudinally shiftable barrel arranged within said casing, the bore of which barrel is in communication with said chamber by means of ports when said valve is in open position, a pin secured to said barrel and penetrating the admission port of said nipple, means including a finger piece carried by said barrel for shifting said barrel rearwardly to unseat the valve, a spring for returning said barrel to normal position, and means cooperative with said barrel to limit its forward movement.

JOHN W. WILLIAMS.